April 25, 1961   A. LOGES   2,981,309
FEEDING DEVICE FOR TIRE BUILDING DRUMS
Filed Oct. 11, 1956
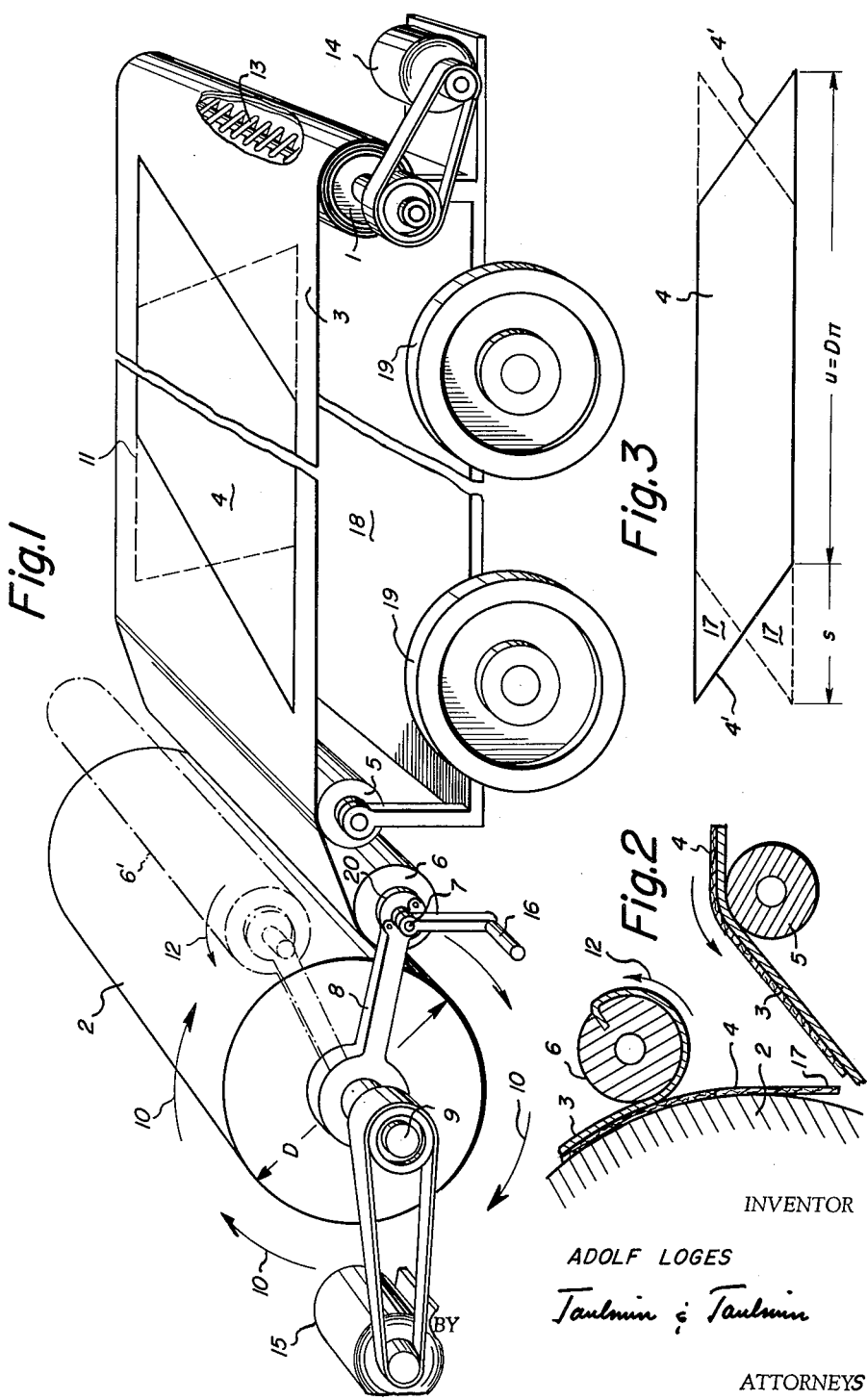
INVENTOR
ADOLF LOGES
BY Toulmin & Toulmin
ATTORNEYS

United States Patent Office 2,981,309
Patented Apr. 25, 1961

2,981,309

FEEDING DEVICE FOR TIRE BUILDING DRUMS

Adolf Loges, Hannover, Germany, assignor to Continental Gummiwerke Aktiengesellschaft, Hannover, Germany Filed Oct. 11, 1956, Ser. No. 615,339

Claims priority, application Germany Oct. 11, 1955

6 Claims. (Cl. 154—9)

This invention relates to a device for feeding sheets of material to the tire building drums of tire manufacturing machines and placing such sheets on the drums.

It is known in the art that the quality of air-inflated vehicle tires depends essentially on the structure of the carcass of the tire and especially on the accurate arrangement of the layers of fabric forming the carcass. The apparatus for the manufacture of the tire carcasses which are known in the art have proved to be unsatisfactory in that they do not assure a build-up of the layers of fabric having an optimum degree of accuracy necessary for high quality tires. An approximation of accuracy in assembling the layers of fabric to the tire carcass can be achieved only up to a certain degree by the use of highly specialized and specifically trained personnel.

It is an object of the present invention to provide for a device for feeding and placing sheets of fabric to be assembled to a tire carcass on the tire building drums of tire manufacturing machines in a particularly exact and accurate manner.

It is another object of the invention to provide for a device for feeding and placing sheets of fabric to be assembled to a tire carcass on the drums of tire manufacturing machines which can be operated by unskilled personnel.

It is known to use conveyor belts in a conventional manner with tire building machines for the conveyance of the work pieces only. The conveyor belt transports the sheets of fabric used for building the tire carcass to the drum of a tire manufacturing machine. The feeding device according to the invention is distinguished from these known constructions by the feature that, in addition to this conventional function, the conveyor belt and its accessories are so constructed and arranged that the belt carrying the sheets of fabric on its top surface can be coiled around the receiving drum of the tire manufacturing machine. Together with the conveyor belt, the conveyed sheets of fabric are thereby coiled around the receiving drum and are thus placed on the same. By very simple but ingenious means, this placing operation can be effected in such a manner that the sheets of fabric are placed upon the receiving drum in an extremely accurate manner and thereby form the build-up of the carcass. The conveyor belt thus performs both the conveying and the placing function of the layers of fabric upon the drum.

It is preferred to use a stretch-resistant, substantially unelastic conveyor belt. This belt can be tightened uniformly and evenly during the coiling process and the sheet of fabric between the belt and the receiving drum is placed upon the latter without folds or buckles. Furthermore, if appropriate care is taken to advance the conveyor belt strictly in forward direction towards the periphery of the drum, the sheets of fabric will assume exactly their predetermined position upon the receiving drum conditioned only by the respective position of the sheet of fabric on the conveyor belt. For all these reasons, an accurate, even and tightly fitting placement of each layer of fabric on the receiving drum is accomplished after the sheet of fabric has been put on the flat conveyor belt within a designated area.

According to the preferred embodiment of the invention, a finite conveyor belt is used in cooperation with means for moving the conveyor belt during the coiling operation. These means are adapted to be swivelled about the central longitudinal drum axis, so that the conveyor belt is being coiled around the periphery of the drum and simultaneously the layers of fabric are placed on the receiving drum. These means are generally positioned in parallel direction with respect to the receiving drum and must be sufficiently unelastic to prevent any lateral movements. Lateral movements of the conveyor belt must be avoided during the coiling process. The belt must be tightened and pulled towards the drum in an accurate and straight forward direction.

The invention can also be applied to the manufacture of tire carcasses made from rhomboid shaped fabric layers. These sheets of fabric have a length which is greater than the periphery of the receiving drum, if the tapering end portions are included. At the same time, the conveyor belt which wraps these sheets of fabric of such excessive length about the receiving drum, cannot be wrapped around the entire periphery of the drum, but only by an angle somewhat below 360° only. Separate means must therefore be provided for wrapping about the receiving drum the tapered end portions of the rhomboid shaped sheets of fabric exceeding in length the periphery of the drum. According to the invention, these means consist of roller means at the end of the conveyor belt rotatably fastened to the drum in a position parallel to the latter. Not only can this roller be swung about the central longitudinal axis of the receiving drum, but it is also rotatably mounted and can be made to revolve around its proper central longitudinal axis. Consequently, the roller can perform the residual wrapping operation of the remaining portions of the layer of fabric, when the conveyor cannot continue to do so because of the limited distance it may occupy on the periphery of the tire building drum.

When ever the greatest possible distance on the periphery of the drum has been covered by the conveyor belt, the remaining portions of the layer of fabric are placed on the drum by revolving the aforesaid roller means around its proper central longitudinal axis. The conveyor belt is coiled around the revolving roller and, by dint of this coiling operation and the continuation of the advancing movement of the belt towards the periphery of the receiving drum the remaining, excessive parts of the sheet of fabric are placed in overlapping position upon the drum.

In case a finite conveyor belt is employed, the end of the belt opposite the drum is preferably fastened to a supply roll tensioned by a torsion spring. By overcoming the re-setting energy produced by the torsion spring, any desired length of the belt can be pulled off this supply roll. The torsion spring tensioning the supply roll also keeps the conveyor belt properly tightened and stretched during the coiling operations and, in particular, while the roller arranged at the front end of the conveyor belt is turned about its central, longitudinal axis. Finally, the torsion spring contributes to returning the belt to its initial position, after the placement of any one particular layer of fabric upon the receiving drum has been completed.

The invention will be more fully understood by a detailed description thereof in connection with the accompanying drawings in which Figure 1 is a perspective view illustrating schematically the device for feeding and placing obliquely cut sheets of fabric for the carcass of vehicle tires upon the tire building drum of a tire manufacturing machine, embodying the use of a finite belt;

Figure 2 is a cross sectional view of a part of the apparatus shown in Figure 1;

Figure 3 shows a sheet of fabric used for manufacturing tires and to be placed on the drum shown in Figure 1;

Referring to the drawings now in detail, the device according to my invention comprises the following elements:

A supply roll 1 influenced by a torsion spring 13 can be revolved around its central, longitudinal axis, but is stationary with regard to the receiving drum 2, which is mounted on a rotatable shaft 9, the roll may also be operated by a servo motor 14. The supply roll 1 is stocked with a tension-resistant, finite conveyor belt 3 consisting of a material having a small stretching capacity. At a certain distance from the roll 1 there is arranged a stationary supporting roll 5. The distance between this supporting roll 5 and the supply roll 1 must slightly exceed the total length of the sheets of fabric 4. The end of the conveyor belt 3 about to meet the receiving drum 2 is attached to the periphery of a rigid roll 6 of a material particularly resistant to bending. The studs 7 of this roll 6 are rotatably borne by levers 8 of which only the one forward of drum 2 is shown. At their opposite end, the two levers 8 are rotatably mounted on the central, longitudinal shaft 9 of the drum 2. The roll 6 can therefore be rotated both around its own central, longitudinal axis, as indicated by arrow 12 and also in the direction indicated by the arrows 10 about the shaft 9, while retaining its position parallel to the central, longitudinal axis of the drum 2. Rotation of levers 8 and together therewith of roll 6 about shaft 9 is effected, for instance, by means of a belt drive and motor 15. Rotation of roll 6 about its own axis may be effected, for instance, by a hand crank 16, or similar means.

The motor 14 is a winding motor which has effect upon the supply roll 1 when the spring 13 for any reason is not capable of rotating the supply roll 1 and thereby winding up the belt 3.

Markings 11 are provided on the upper surface of the conveyor belt 3 defining the periphery and indicating the position of the sheets of fabric 4 with reference to both the longitudinal and the transverse extension of the belt 3.

The apparatus just described operates in the following manner:

While the apparatus shown in Figure 1 of the drawings is in its starting position, a sheet of fabric 4 is placed inside of the limits outlined by the markings 11 smoothly upon the conveyor belt 3, which latter is being stretched by the torsion spring 13 on the supply roll 1. Thereupon the lever arms 8 and simultaneously the roll 6 are swung in the direction indicated by the arrows 10 and in counteraction to the resetting energy of the supply roll 1 influenced by torsion spring 13. The sheet of fabric 4 is thus caused to advance together with the supporting conveyor belt 3 toward the receiving drum 2. This movement is continued until a position of the roller 6 has been reached indicated by the dotted outline of roller 6 in Figure 1 and shown enlarged in Figure 2 of the drawings. In the latter position, the conveyor belt 3 has been wound almost entirely around the periphery of the receiving drum 2 and a corresponding stretch of the sheet of fabric has been placed on the latter. The swivelling motion of roller 6 is brought to a halt when the roller meets the other end of the conveyor belt which is being coiled on the drum. Because of this circumstance, and because of the fact that the total length of the sheets of fabric 4 exceeds the periphery $U = D \cdot \pi$ of the drum 2 by the amount s. (D being the diameter of drum 2) the roller 6 must then be rotated about its own axis in the direction indicated by arrow 12. Thereby, the conveyor belt 3 is coiled upon the roller 6, while the other portions of the belt are being continuously advanced and while, at the same time, the sheets of fabric 4 continue to be wound around the periphery of the receiving drum 2. In consequence of the coiling motion of the roller 6, the front end 17 of the sheets of fabric is released. (See Figure 2). For a brief moment after this release, the front portion of the sheet hangs down but is then gripped by the conveyor belt which is advanced underneath the sheet, until the entire sheet rests upon the mantle of the drum 2. At this position, the edges 4' of the sheet of fabric 4 are facing each other on the periphery of the drum. The operation of placing one sheet of fabric is now completed. The next following sheet of fabric can then be placed on the drum and so forth. This can be done in such a manner that the threads of every subsequent sheet of fabric form an angle with the threads of the respective preceding layer of fabric.

After the placement of each particular sheet upon the receiving drum, the levers 8 are returned to their respective initial positions. During this resetting operation, the resetting energy of the torsion spring 13 of the supply roll 1 comes into play and thus facilitates the coiling-up process of the belt 3 on roll 1 and the uncoiling of belt 3 from drum 2, and roller 6. After the layers of fabric building up the carcass have been properly placed, the additional steps required for building up the crude tire are carried out. In order to facilitate this further manufacture of the tire, the apparatus of my invention is preferably arranged in a supporting frame 18 which is transportable, for instance on wheels 19 so that it can be moved away from the drum 2, once the carcass is completely built up. At the same time, either the levers 8 have to be disengaged from the shaft 9 or the roll 6 must be detached from the levers 8 if the latter remain in connection with the machine proper. This can be done by opening a clamp 20 at the end of levers 8.

For the practical operation of the machine of my invention, the position of the supporting roll 5 relative to the drum 2 is particularly important. The roll 5 is preferably located at a certain distance from, but at the same time compartively close to the drum 2, as shown in Figure 2 of the drawings. The roll should also be so positioned with respect to the longitudinal central axis of the drum 2 that it is located in, or at least close to the horizontal plane determined by the longitudinal central axis of the drum 2. This position of the supporting roll 5 will facilitate the coiling operation of roller 6 and thereby the placement of fabric sheet 4. The supporting roll prevents the free end of fabric sheet 4 from being bent, clamped or buckled and assures its regular forward motion and even placement influenced by the advancing conveyor belt 3.

Whenever the roller 6 is in motion and the conveyor belt is being coiled on the drum 2, the latter should, of course, have substantially the same rotary speed at its periphery as the conveyor belt, in order to exclude any friction and to prevent any disturbance of the regular and even placement of the sheets of fabric upon the receiving drum.

In the preferred embodiment of the invention which has just been described, a finite conveyor belt is employed and the necessary elements of the machine can thus be kept at a minimum.

It will be understood that this invention is susceptible to modification in order to adapt it to different usages and conditions, and, accordingly, it is desired to comprehend such modifications within this invention as may fall within the scope of the appended claims.

What I claim is:

1. For use with tire manufacturing machines, the combination of a tire building drum, a drum shaft, a longitudinally movable finite conveyor belt extending transversely to the axis of said drum carrying sheets of fabric for building a tire therefrom, torsion spring urged means for coiling up said conveyor belt, said means being spaced from said drum and adapted for stretching said belt, and moving means for moving said conveyor belt longitudinally into contact with the tire building drum and winding said conveyor belt circumferentially about said drum so as to coil said sheets of fabric therearound, said moving means comprising a rigid roll rotatable about its own axis so as to advance the forward portion of the fabric sheet around said drum into contact with the end portion of said sheet, and a pair of levers mounted on said drum shaft for carrying said rigid roll on their free ends in a position parallel to said drum.

2. A device as described in claim 1, further comprising a supply roll fastened to that end of said conveyor belt away from said tire building drum, said supply roll being rotatably mounted in parallel direction to the longitudinal axis of said receiving drum, and a torsion spring attached to said supply roll and tending to force the supply roll in a reversed direction relative to the advancement of said conveyor belt towards said receiving drum.

3. A device as described in claim 1, further comprising a supporting roll being mounted out of contact but close to said receiving drum and being located substantially in the plane defined by a prolongation of the central, longitudinal axis of said receiving drum, said supporting roll supporting from underneath the portion of said conveyor belt in the proximity of said receiving drum.

4. A device as described in claim 1, wherein the upper surface of said conveyor belt is provided with a marking outlining the contours of said sheet of fabric, one of which sheets of fabric is to be placed exactly upon said marked area, said marked outline thus assuring the accurate placement of each layer of fabric upon said receiving drum, and the exactly congruential placement of each following layer with respect to all preceding layers.

5. A tire building machine, comprising, in combination: a tire building drum mounted for rotation about its axis; a roller mounted for movement about the circumference of said drum along a circular path the axis of which is coincident with the axis of said drum, said roller also being rotatable about its own axis; means for moving said roller along said circular path; means for rotating said roller about its own axis; and a finite conveyor belt associated with said roller and adapted to be moved thereby into contact with said drum, whereby a sheet placed upon said conveyor belt may be coiled about the entire circumference of said drum by first moving said roller throughout a portion of said circular path and thereafter rotating said roller about its own axis.

6. A tire building machine, comprising, in combination: a tire building drum mounted for rotation about its axis; a roller mounted for movement about the circumference of said drum along a circular path the axis of which is coincident with the axis of said drum, said roller also being rotatable about its own axis; means for moving said roller along said circular path; means for rotating said roller about its own axis; a finite conveyor belt associated with said roller and adapted to be moved thereby into contact with said drum; and means for maintaining a portion of said conveyor belt means substantially flat, whereby a sheet placed upon the flat portion of said conveyor belt may be coiled about the entire circumference of said drum by first moving said roller throughout a portion of said circular path and thereafter rotating said roller about its own axis.

References Cited in the file of this patent

UNITED STATES PATENTS

| | | |
|---|---|---|
| 987,790 | Ball | Mar. 28, 1911 |
| 2,473,067 | Miller | June 14, 1949 |
| 2,565,071 | Frazier | Aug. 21, 1951 |
| 2,567,150 | Frazier et al. | Sept. 4, 1951 |
| 2,742,240 | Stephens et al. | Apr. 17, 1956 |
| 2,756,939 | Kawazura | July 31, 1956 |
| 2,880,943 | Stephens et al. | Apr. 7, 1959 |
| 2,881,984 | Dyken | Apr. 14, 1959 |

FOREIGN PATENTS

| | | |
|---|---|---|
| 715,469 | Great Britain | Sept. 15, 1954 |